United States Patent
Ishizuka (10) Patent No.: US 8,566,701 B2
(45) Date of Patent: Oct. 22, 2013

(54) CONVERTING METADATA FOR APPLICATIONS HAVING DIFFERENT METADATA FORMATS

(75) Inventor: Hiroaki Ishizuka, Ridgewood, NJ (US)

(73) Assignees: Ricoh Company, Ltd., Tokyo (JP);
Ricoh Americas Corporation, West Caldwell, NJ (US)

( * ) Notice: Subject to any disclaimer, the term of this patent is extended or adjusted under 35 U.S.C. 154(b) by 755 days.

(21) Appl. No.: 12/250,932

(22) Filed: Oct. 14, 2008

(65) Prior Publication Data

US 2010/0095202 A1 Apr. 15, 2010

(51) Int. Cl.
*G06F 17/30* (2006.01)

(52) U.S. Cl.
USPC .......................... 715/234; 707/602; 707/756

(58) Field of Classification Search
None
See application file for complete search history.

(56) References Cited

U.S. PATENT DOCUMENTS

| | | | |
|---|---|---|---|
| 6,584,466 B1 * | 6/2003 | Serbinis et al. | 715/209 |
| 7,058,662 B2 | 6/2006 | Wiggins et al. | |
| 2001/0037460 A1 * | 11/2001 | Porcari | 713/201 |
| 2003/0009345 A1 * | 1/2003 | Thorpe | 705/1 |
| 2004/0034688 A1 | 2/2004 | Dunn | |
| 2006/0010148 A1 * | 1/2006 | Sattler et al. | 707/101 |
| 2007/0088690 A1 | 4/2007 | Wiggen et al. | |
| 2007/0157100 A1 | 7/2007 | Wiggen | |
| 2009/0030948 A9 * | 1/2009 | Lipman et al. | 707/200 |

* cited by examiner

*Primary Examiner* — Stephen Hong
*Assistant Examiner* — Asher Kells
(74) *Attorney, Agent, or Firm* — Cooper & Dunham LLP (57) ABSTRACT

System, apparatus and method for managing documents and metadata generated by a plurality of software application systems are provided.

19 Claims, 7 Drawing Sheets

| agreement ID | customer (company name) | customer address | agreement type | agreement date | product/service | final |
|---|---|---|---|---|---|---|
| 100001 | XYZ, Inc. | 101 River Road, Parsippany, NJ 07014 | sale of goods | 7-1-2007 | MFP 1000C | Yes |
| . . . | | | | | | |
| 320853 | Safe Accountants, Ltd. | 999 Broad Street, Newark, NJ 07001 | service agreement | 1-15-2007 | consulting services | Yes |
| . . . | | | | | | |

CONVERTING METADATA FOR APPLICATIONS HAVING DIFFERENT METADATA FORMATS

TECHNICAL FIELD

This disclosure relates to management and use of metadata that is generated by software application systems. In particular, the disclosure relates to conversion and automatic passing of metadata to automate at least some aspects of a workflow when plural different applications are utilized in the workflow.

BACKGROUND

In the current information age, it has often been discussed that proliferation of information technology (IT) can lead to more convenience, efficiency, productivity, enjoyment, etc., in life. The extensive use and development of IT tools for managing data or information in, for example, an enterprise (or other organization) environment, is exemplified by use, in many instances, of a variety of heterogeneous software applications in a workflow.

In such typical heterogeneous environment, the data, documents and files generated by one software application in many instances are not readily accessible and/or usable by another application.

Metadata is commonly used in an IT system where the data is the content of computer files, to facilitate the understanding, characteristics, and management of the data (that is, computer files), and for example, includes name of the file, type of the file, name and length of individual data items, name of the author or administrator of the data or file, etc. Some examples of use of metadata in an IT environment are described in commonly-owned application Ser. No. 12/112,709, entitled "MANAGING ELECTRONIC DATA WITH INDEX DATA CORRESPONDING TO SAID ELECTRONIC DATA", the entire contents of which are incorporated herein by reference.

Thus, metadata can be efficaciously used to manage data. However, conventional systems typically do not allow shared use of metadata across heterogeneous systems. Thus, even if an application system can convert the document or file generated by another application system, the former application system generally does not make efficient (if any) use of the metadata generated by the latter system.

BRIEF SUMMARY

In an aspect of this disclosure, there is provided an apparatus for managing metadata for a plurality of systems having respective different data and/or metadata formats. The apparatus converts metadata generated by one system in a first format in connection with a first document, to a second format of a second system, and passes the converted metadata in the second format to the second system. Thus, the metadata generated by the first system can be utilized by the second system within a workflow of the environment, without the second system or the first system being adapted to handle the particular format of the other.

In another aspect of this disclosure, there is provided a management system including a plurality of application systems for generating documents in an enterprise, each of the application systems generating a corresponding type of documents and associated metadata of a corresponding format. The management system can be configured to include various features of the above-mentioned apparatus.

In operation, a first application system typically stores a first document and associated first metadata generated by the first application system, in a data store part. A conversion part converts the stored first metadata in the first format of the first application system to a second format of a second application system. A metadata passing part can automatically pass the converted metadata in the second format to the second application system.

In an example, when the first document and associated metadata generated by the first application system is stored in the data store part, a notification part can send a notification message indicating that the first document has been generated and stored. The second application system (or a user using the system) informed by the notification can request the first metadata, and in response to the request for the first metadata, the conversion part converts the stored first metadata in the first format to the second format, and the metadata passing part passes the converted first metadata in the second format to the second application system.

The second application system can utilize the converted metadata in connection with generation of a second document, which is associated with the first document, and second metadata generated in connection with the second document. The conversion part converts the second metadata into a third format of a third application system.

The management system can further comprise a user interface part which presents the second document for finalization, and when the second document is finalized through the user interface part, the conversion part converts the second metadata to indicate that the second document has been finalized. Further, the notification part can send a notification message indicating finalization of the second document.

BRIEF DESCRIPTION OF THE DRAWINGS

The features of the present disclosure can be more readily understood from the following detailed description with reference to the accompanying drawings wherein.

DETAILED DESCRIPTION OF EXEMPLARY EMBODIMENTS

This disclosure provides tools for managing workflow in a heterogeneous environment in which plural software application systems are used in the workflow. Such tools enable the sharing of metadata across the plural application systems. The metadata is converted and automatically passed amongst the systems to automate at least some aspects of the workflow.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Illustrative embodiments and examples are described infra in the exemplary context of an enterprise workflow that is triggered by entry of new customer data (for example, a new customer or new work request from existing customer).

Figure 1A:
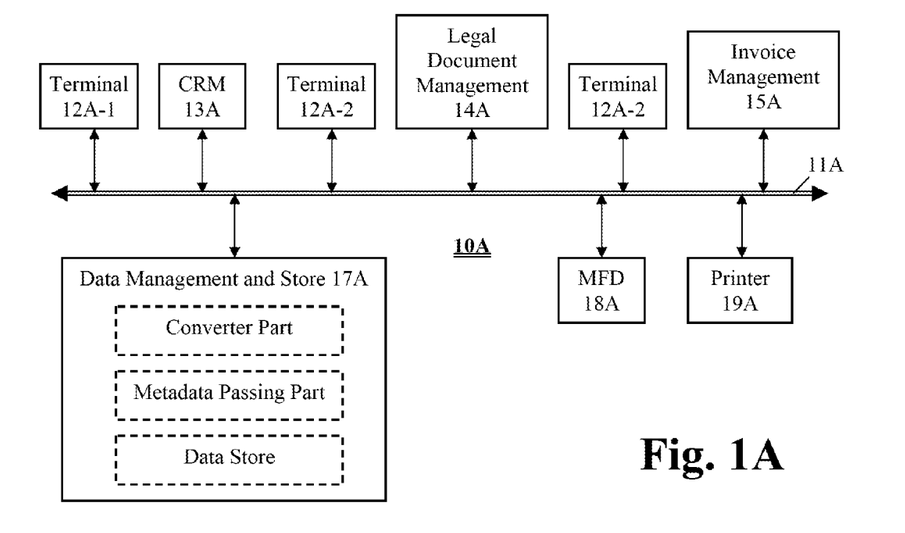
FIGS. 1A-1C show examples of configuration of a system, according to an exemplary embodiment of this disclosure.
Figure 1B:
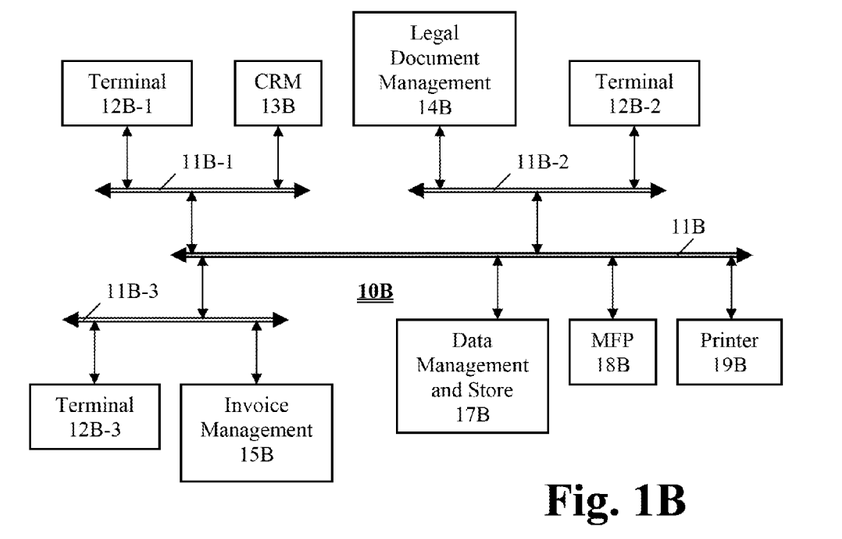
Figure 1C:
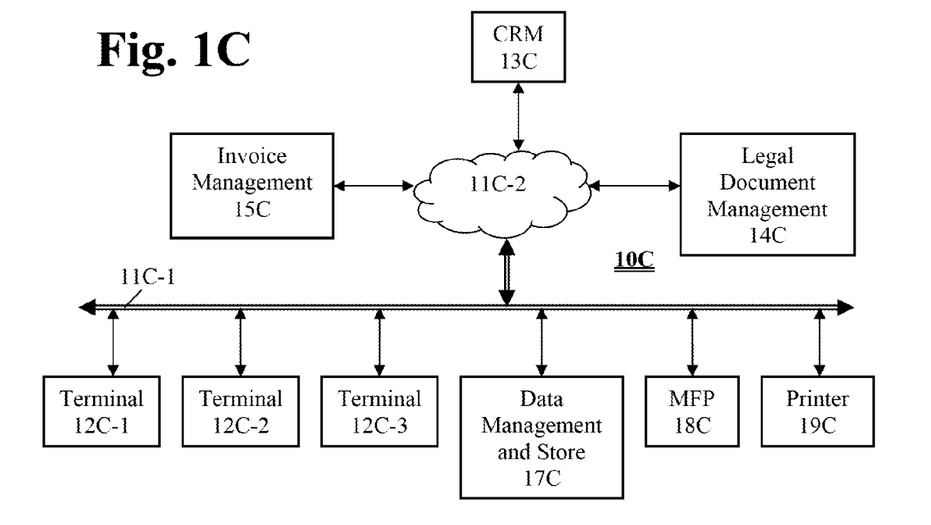

In such context, the IT system for supporting such workflow can have any of various configurations. Examples of system configurations are shown in FIGS. 1A-1C. In each example, the system includes a customer relationship management (CRM) subsystem, a legal document management subsystem and an invoice management subsystem. Each of the subsystems is typically a standalone, vendor-specific system that has its own specific data format and that maintains metadata specific to, and associated with, the documents that can be generated with the system.

In system 10A shown in FIG. 1A, terminals 12A-1, 12A-2, 12A-3, CRM system 13A, legal document management system 14A, invoice management system 15A, data management and store 17A, multi-function device (MFD) 18A and printer 19A are connected through network 11A.

The network 11A can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 11A. In addition, the network 11A preferably uses TCP/IP (Transmission Control Protocol/Internet Protocol), but other protocols can also be used. How devices can connect to and communicate over the network 11A is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

While the example shown in FIG. 1A includes three terminals (12A-1, 12A-2, 12A-3) and three application subsystems (13A, 14A, 15A), it should be appreciated that such numbers of terminals and subsystems are arbitrary and are selected as an example in order to facilitate discussion, and that the subject matter of this disclosure can be implemented in a system including one or more terminals and two or more application subsystems.

The CRM system 13A can be any of various customer relationship management systems that enable an enterprise to handle contacts with customers, support customer contacts, store information regarding current and prospective customers, etc. Some examples of CRM systems include SAP CRM, Siebel CRM, Oracle CRM OnDemand, PeopleSoft Enterprise Customer Relationship Management, Microsoft Dynamics CRM, Salesforce CRM, Infor CRM Epiphany, etc.

Details regarding any customer contacts can be stored in the CRM system. The contacts can entail any front office interactions with customers, such as face to face meetings, phone calls, e-mail, online services, etc. In addition, the CRM system may store information for back office operations that ultimately affect the activities of the front office (such as billing, maintenance, planning, marketing, advertising, finance, manufacturing, etc.). Further, the CRM system may store business relationship information regarding interaction with other companies and partners, such as suppliers/vendors and retail outlets/distributors, industry networks (lobbying groups, trade associations, etc.).

Information in the CRM system can typically be accessed and/or entered by employees in different departments of the enterprise, such as sales, marketing, customer service, training, professional development, performance management, human resource development, and compensation (but it should be appreciated that in some enterprises, customer contacts will be limited to selected departments/employees, and therefore access to the CRM system may in some instances be limited). Such system can enable improved services provided directly to customers and use of the information in the system for targeted marketing and sales purposes. The data maintained by the CRM system can be analyzed in order to plan targeted-marketing campaigns, generate business strategies, and assess any success of CRM activities (for example, market share, number and types of customers, revenue, profitability, etc.).

In the system 10A, new customer data (for example, new customer or new request from existing customer) can be entered in the CRM 13A, and typically such data entry triggers generation of a draft of a legal document (for example, a contract or agreement) proposing terms of the transaction (for example, payment in exchange for goods or services). In a conventional approach, the draft document is usually prepared by a member of the legal department of the enterprise, with or without use of application software specific to generation of such legal documents. In any event, such legal department member is generally disconnected from the customer contact, and would not have known that new customer data is available, unless notified by a member of the sales department (or someone else having such knowledge).

In the system 10A, data management and store 17A automatically generates and sends a notification message (for example, e-mail, voice mail, etc.) to a specific user or administrator in the legal department, indicating that new customer data has been input and stored. Such notification triggers action by an appropriate member of the legal department to utilize the legal document management system 14A to generate a draft of an appropriate legal document for the relevant transaction corresponding to the new customer data.

The legal document management system 14A can be any of various document preparation systems that replace the cumbersome manual preparation of commonly-used documents, such as systems that utilize a template-based approach in which an appropriate template is selected and used as a starting point for drafting the document, and the document is further processed to include additional data. Such systems can allow enterprises to minimize data entry, reduce the time spent proof reading, and reduce the risks associated with human error, particularly, when the document is voluminous. Some examples of such document automation systems include Xpertdoc, 4TOPS, Perfectus, COMET Intelligent Documents, Zumesoft, Copanion, HotDocs, GhostFill, DealBuilder, Rapidocs, Exari, QShift, D3, ActiveDocs, Pathagoras, etc.

Conventional document automation approaches typically require the user to answer software-driven interview questions or data entry screen, and then the information collected is utilized to populate the document to form a first draft. Some document automation systems automate the data replacement task by importing data already in the format required by the document automation system (such as obtained by the system in a previous session, through a user interface, or by another software module that uses the same data format, etc.). However, such systems generally do not include modules that automatically convert metadata generated by other applications systems from other vendors, as provided by the subject matter of this application.

In the present example, the CRM 13A and the legal document management system 14A are substantially different systems that utilize different formats and are supplied by different vendors. As is typically the case, neither the CRM 13A nor the legal document management system 14A includes conversion facilities for converting data to and/or from the other.

On the other hand, the data management and store apparatus 17A is configured to include a conversion part and a metadata passing part, in addition to a data store.

When a user utilizes the CRM system 13 to enter new customer data, the entered data is stored as a document or file, accompanied by metadata. The conversion part converts the metadata generated by the CRM system 13A which is in a format specific to the CRM system 13A, to another format suitable for use by the legal document management system 14A. For example, such conversion may be performed when the metadata and the associated document is being stored in the data store. On the other hand, the conversion may be performed in response to a request, from the legal document management system 14A, for the metadata. In another example, the conversion part receives the metadata from the CRM system 13A (without the metadata having been retrieved from the data store) and converts the received metadata in the format of the CRM 13A to the format of the legal document management system 14A. In any event, the metadata passing part can automatically pass the converted metadata in the appropriate format to the legal document management system 14A.

The legal document management system 14A is used to generate a second document, associated with the first document and utilizing the converted metadata of the CRM 13A, and metadata is generated by the legal document management system 14A in connection with the second document. When such second document generated using the legal document management system 14A is finalized, the conversion part converts the metadata of the legal document management system 14A into the format of the invoice management system 15A.

The invoice management system 15A is substantially different, and utilizes a different format, than the CRM 13A and the legal document management system 14A. The invoice management system 15A, similar to the CRM 13A and the legal document management system 14A, does not include conversion facilities for converting data to and/or from the other application systems. Some examples of invoice management systems include Simple Invoice Management System, eCity Receivables, etc.

In the example of FIG. 1A, the system 10A is shown generically as a networked environment in which any of the devices connected to the network 11A can avail itself (assuming no access limitations) of the assorted functionalities connected to the network. Thus, any of the terminals 12A-1, 12A-2, 12A-3 can invoke the services of any or all of the CRM system 13A, legal document management system 14A, invoice management system 15A, data store 17A, multi-function device 18A and printer 19A.

In another example, such as shown in FIG. 1B, each of CRM system 13B, legal document management system 14B and invoice management system 15B is connected, along with one or more corresponding terminals, to a corresponding subnet (11B-1, 11B-2, 11B-3) of the network 11B. The subnet 11B-1, 11B-2, 11B-3 may be assigned to, for example, respective departments or work groups of the enterprise. In such example, the terminals may be, for example, desktop or workstation computers configured for use with the application systems of interest to the departments or work group. Thus, for example, the terminal 12B-1 which is connected to the same subnet 11-B-1 to which the CRM 13B is connected may be configured with applications regularly used by the sales department. Conversely, the terminal 12B-2 which is connected to the same subnet 11-B-2 to which the legal document management system 14B is connected may be configured with applications regularly used by the legal department. On the other hand, the terminal 12B-3 which is connected to the same subnet 11B-3 to which the invoice management system 15B is connected may be configured with applications regularly used by the accounting department.

However, even in such example of FIG. 1B, each of the terminals 12B-1, 12B-2, 12B-3 can generally access any of the network-connected functionalities in the system 10B, including data management and store 17B (similar to the data management and store 17A in FIG. 1A), multi-function device (MFD) 18B and printer 19B.

In another example, such as shown in FIG. 1C, any or all of the CRM system 13C, legal document management system 14C and invoice management system 15C may be provided as software as a service (SaaS) through, for example, the Internet or extranet 11C-2. SaaS is currently a popular software delivery approach wherein enterprises and users obtain access, over the Internet, to applications and related services that would otherwise have to be located on their own personal or enterprise computers. In such example, the data management and store 17C can maintain and store the documents and metadata generated by the applications, and is configured to communicate the CRM system 13C, legal document management system 14C and invoice management system 15C through the Internet or extranet 11C-2. The functionalities of the data management and store 17C are otherwise similar to those of the data management and store 17A in FIG. 1A.

In any event, in each of the examples shown in the FIGS. 1A-1C, a data management apparatus is provided in the system to facilitate use of metadata in the workflow.

Figure 2:
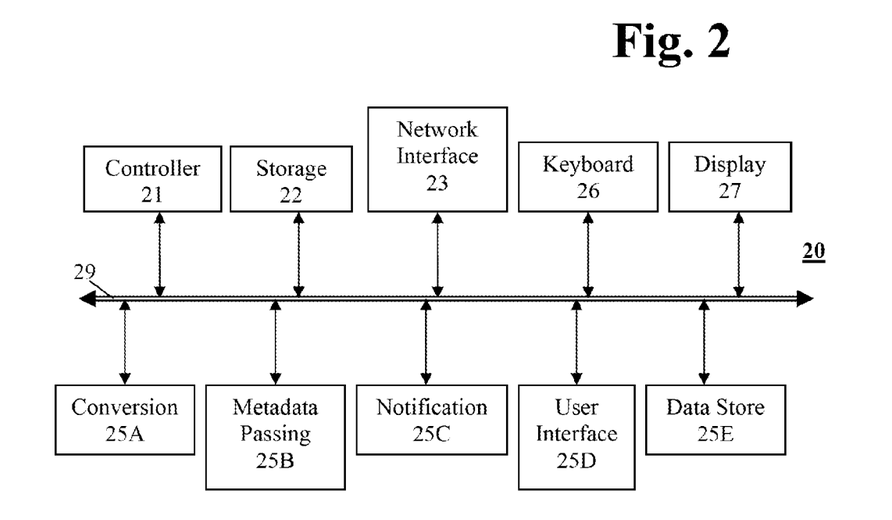
FIG. 2 shows an exemplary constitution of a device that can operate as a data management apparatus in the systems shown in FIGS. 1A-1C.

FIG. 2 shows an exemplary constitution of a device 20 that can operate as a data management apparatus. As shown in FIG. 2, the device 20 includes a controller (or central processing unit) 21 that communicates with a number of other components, including memory or storage part 22, network interface 23, keyboard 26 and display 27, by way of a system bus 29.

As should be appreciated by one skilled in the art, the device 20 may be a conventional personal computer or computer workstation with sufficient memory and processing capabilities and configured through software to operate as a data management apparatus. Further, if adequate storage, processing and communication capabilities are included, the computing device can double as a database server (which in many respects can be configured similarly) to service requests from clients for data in the data store.

In the device 20, controller 21, memory/storage 22, network interface 23, keyboard 26 and display 27 are conventional, and therefore in order to avoid masking the inventive aspects of this disclosure, such conventional aspects will not be discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

The controller 21 executing program code instructions controls operations of the various parts of the data management apparatus, including conversion part 25A, metadata passing part 25B, notification part 25C, user interface 25D and data store 25E.

The conversion part 25A and metadata passing part 25B are similar to the conversion part and metadata passing part of the data management 17A of FIG. 1A. The conversion part 25A converts metadata generated or entered through a first application system, such as CRM 13A, 13B, 13C, in a first format in connection with a document or other file generated by the application system, to another format of another application system, such as legal document management system 14A, 14B, 14C. The metadata passing part 25B passes the converted metadata in the second format to the other application system.

The converted metadata can be stored along with the document associated with the metadata in the data store 25E. When the document and associated metadata generated by the CRM are stored in the data store 25E, the notification part can optionally send a notification message indicating that the document and metadata have been generated and stored. It should be noted that while a data store is shown in FIGS. 1A-1C and 2 as being a part of the data management apparatus, it should be apparent that the data store can be external to the host of the data management apparatus, and even remote from the host.

The data store 25E can store one or more documents in association with the metadata. For example, when the metadata passing part 25B passes the converted metadata (from conversion of metadata from the CRM to the format of the legal document management system) to the legal document management system, the legal document management system utilizes the converted metadata in connection with generation of a second document, associated with the first document, and second metadata generated in connection with the second document. Each of the converted metadata from the conversion part and the second metadata generated in connection with the second document can be associated both with the document generated by the CRM as well as the second document generated by the legal document management system.

The user interface 25D can optionally present the second document for finalization. When the second document is finalized through the user interface 25D, the conversion part 25A converts the second metadata to indicate that the second document has been finalized, and the notification part 25C sends a notification message indicating finalization of the second document. The notification can trigger generation of an invoice in connection with the transaction.

The data management apparatus is shown as a separate device in the exemplary systems of FIGS. 1A-1C. However, the data management apparatus can be incorporated in any of the terminals 12A-1, 12A-2, 12A-3, 12B-1, 12B-2, 12B-3, 12C-1, 12C-2, 12C-3 (when configured as, for example, a workstation computer with suitable processing, communication and storage resources) and/or in any of MFDs 18A, 18B, 18C.

An example of a multi-function device (MFD) or multi-functional peripheral device (MFP) which includes scanning and printing functions, and additionally can serve as a user terminal for entering, saving and accessing electronic data, and in which one or more databases or data storage parts can be resident will be discussed below with reference to FIG. 3.

MFP apparatus 30 can include a controller 31, and various elements connected to the controller 31 by an internal bus 39. The controller 31 controls and monitors operations of the MFP 30. The elements connected to the controller 31 include storage 32 (for example, random access memory, read-only memory, hard disk drive, portable storage media drive such as for optical discs, magnetic discs, magneto-optical discs, etc., semiconductor memory cards, combinations of storage media, etc.), printer and scanner engines 33, network interface (I/F) 35, data converter 37 for converting data from one format to another format (for example, suitable for printing, faxing, e-mailing, etc.), and user interface 38. The controller 31 also utilizes information stored in user management table 36 to authenticate the user and control user access to the functionalities of the MFP.

Storage 32 can include one or more storage parts or devices, and program code instructions can be stored in one or more parts or devices of storage 32 and executed by the controller 31 to carry out the instructions. Such instructions can include instructions for performing specified functions (such as printing, scanning, faxing, copying, e-mailing, etc.) of the MFP, to enable the MFP to interact with a terminal and/or another network-connected device (such as a CRM system, legal document management system, invoice management system, etc.), through the network interface 35, and to control the data converter 37, access data in the user management table 36, and interactions with users through the user interface 38.

Figure 3:
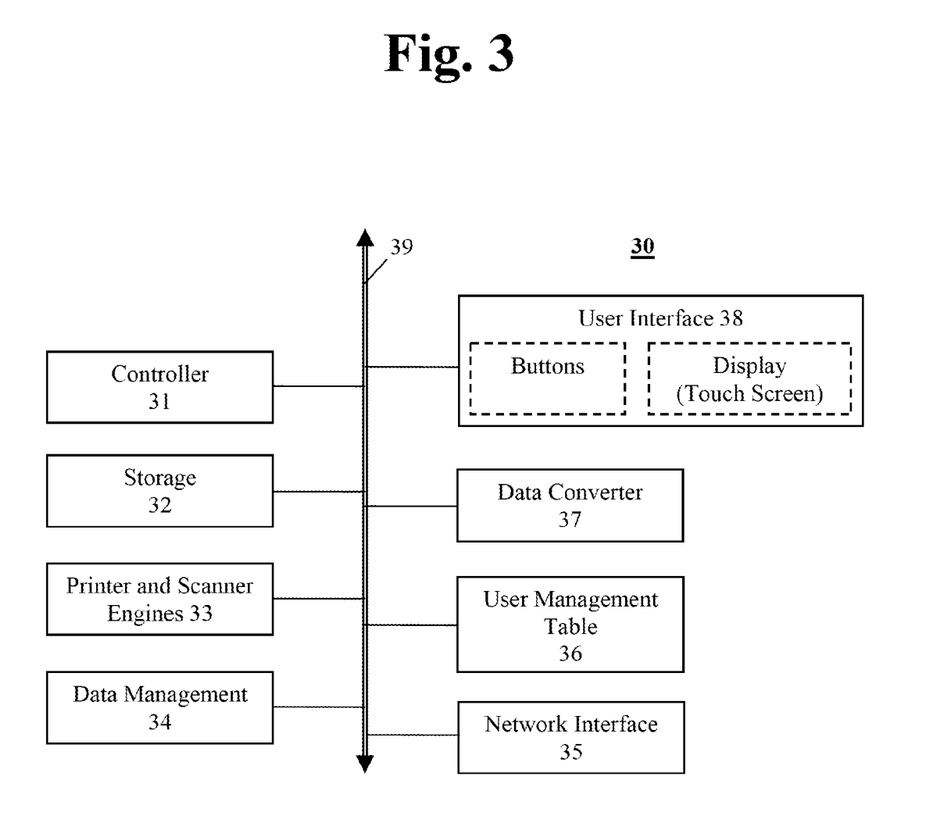
FIG. 3 shows a block diagram of a multi-function device including a data management apparatus, according to another exemplary embodiment of this disclosure.

In addition, while a data management apparatus 34 is shown in FIG. 3 as being connected to the internal bus 39, since the MFD 30 has essentially the processing and storage resources needed for the data management function, the data management apparatus 34, as it should be apparent, can be software-configured to include any or all of the data management features described in this disclosure.

The user interface 38 includes one or more display screens that display, under control of controller 31, information allowing the user of the MFP 30 to interact with the MFP. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP, so as to allow the operator to interact conveniently with services provided on the MFD, or with the MFD serving as terminal for accessing electronic data or other content through the network. For example, a browser (such as Internet Explorer™, Netscape Navigator™, a proprietary browser, etc.) may be provided on the MFD so that the operator can use browsing operations to access network connected (as well as local) databases or data stores. As another example, the operator can scan a document, and use the browser to upload the scanned document image (and specify additional information or metadata associated with the document) to a data store.

The display screen does not need to be integral with, or embedded in, a housing of the MFP, but may simply be coupled to the MFP by either a wire or a wireless connection. The user interface 38 may include keys and/or buttons (such as graphical keys or buttons, or other graphical elements, of a GUI on a touchscreen display) for inputting information or requesting various operations. Alternatively, the user interface 38 and the display screen may be operated by a keyboard, a mouse, a remote control, voice recognition, or eye-movement tracking, or a combination thereof.

Since the MFP 30 is typically shared by a number of users, and is typically stationed in a common area, the MFP preferably prompts the user to supply authentication information, such as user name (or other user or group information), password, access code, etc. The authentication information can be compared to data stored in the user management table 36 to confirm that the user is authorized to use the MFP. The authentication information may also be stored for the session and automatically supplied if access to other devices through the network requires it. On the other hand, such other devices may prompt the user to supply other authentication information through the user interface.

Another way for authenticating a user is for a user to swipe an access card through a card reader (not shown). Such access card can include user identification information, as well as account information to enable the management server to identify and authenticate the user, determine any credits remaining in the user (or group) account and allow such information to be displayed at the MFP upon request of the user.

Other methods of authentication may also be used. For example, the multi-function device may be equipped with one or more biometrics means (such as comparing fingerprints, palm prints, voice or speech, retinas or irises, facial expressions or features, signature, etc.).

It will be appreciated that although not referenced explicitly above, the data management apparatus as well as the CRM system, the legal document management system and the invoice management system preferably requires authentication information (for example, login information, user ID, password, other authentication information such as mentioned above in connection with the MFD shown in FIG. 3, etc.) before any data and/or resources are made available through the system. In the case that the data management apparatus is embedded in a host device, such authentication information can be derived from host login.

Printer and scanner engines 33 and network interface 35 (similar to interface 23 in FIG. 2 and interface 36 in FIG. 3) are otherwise conventional, and therefore, a detailed description of such conventional aspects are omitted in the interest of clarity and brevity (so as not to mask the novel aspects of the subject matter of this disclosure).

The MFD 30 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

For example, when a document is finalized, such as when the document is signed and executed by appropriate signatories, the signed document may be scanned and the scanned image may be stored in the data store along with the electronic document.

An example of a typical workflow when, for example, the system 10A shown in FIG. 1A is used is explained infra with reference to FIGS. 4-7.

Figure 4:
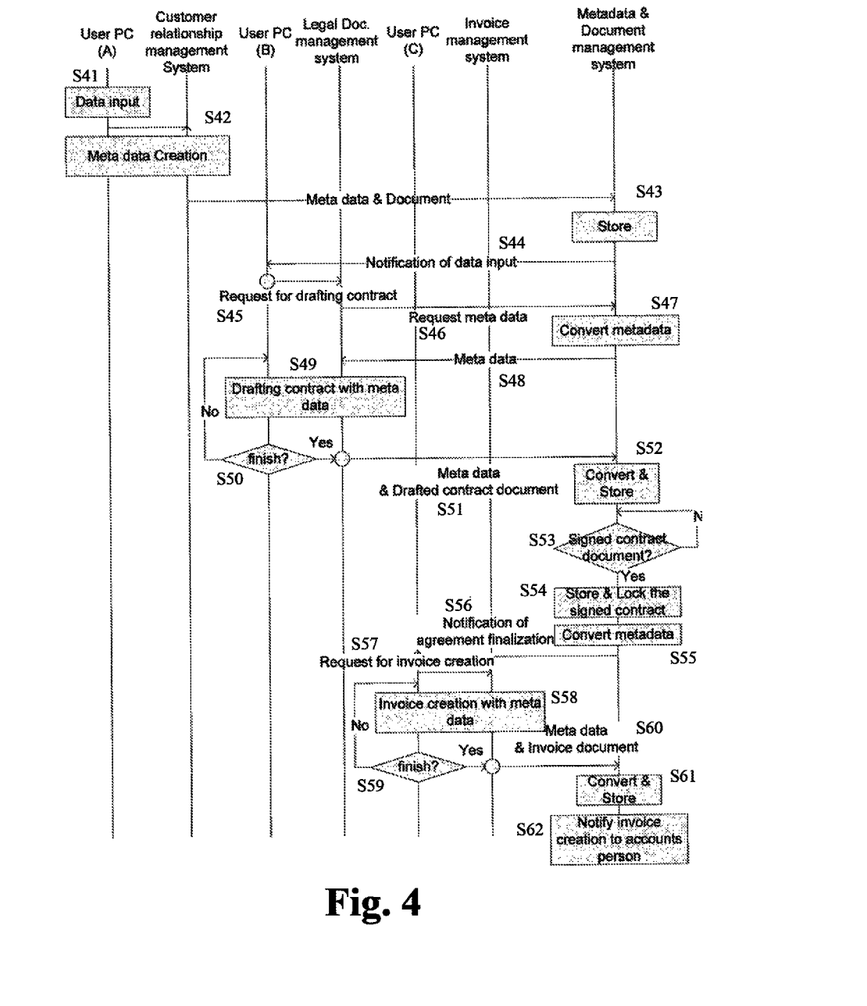
FIG. 4 shows a schematic representation of a workflow on any of the systems shown in FIGS. 1A-1C.

The workflow is initiated by entry of new customer data (for example, new customer or request from existing customer) at a terminal (A) by a user of the CRM system 13A (step S41). As the user enters data, the CRM 13A generates metadata in its normal course (step S42). When data is completed, the document (or user entered data) and the metadata generated by the CRM system 13A are forwarded to, and stored in, the data management and store device 17A (S43). Thereafter, a notification is transmitted to a user (B) of the legal department indicating that new customer data has been entered and stored (step S44).

Figure 5:
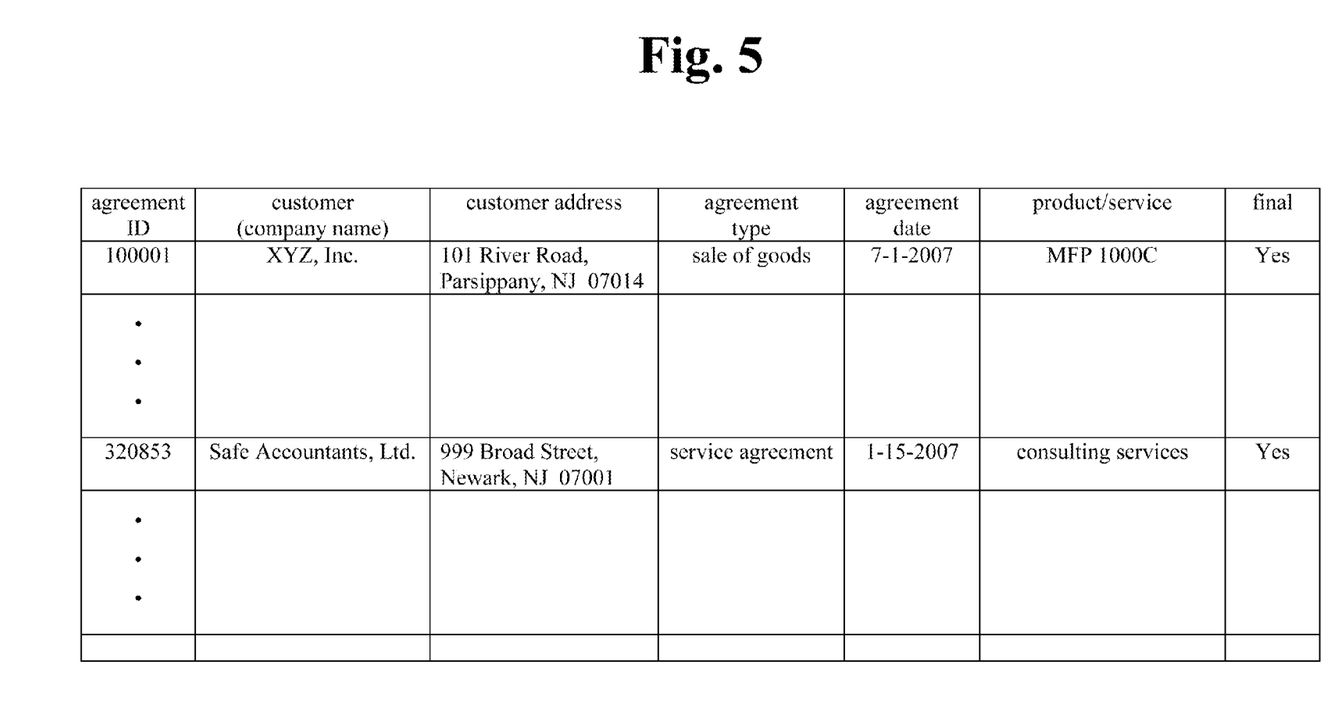
FIG. 5 shows a notional view of an example of metadata stored in a data store of any of the data management apparatuses shown in FIGS. 1A-3.

A notional view of the metadata stored in the data store presented in the form of a table is shown in FIG. 5. Each customer request is automatically assigned a unique ID number (agreement ID). In addition, the new customer data typically includes customer name, customer address, agreement type (for example, sale of goods, service agreement, renewal of pre-existing agreement, etc.), products to be supplied or services to be rendered, etc. It should be appreciated that other metadata may also be stored and that FIG. 5 merely shows a sample of the metadata. Further, it should be appreciated some of the metadata that is to be stored in the data store may or may not be based on new customer data but in any event can be modified based on information supplied or generated at a later stage (for example, agreement date, invoice number, invoice date, etc.).

After receiving the notification, the user B requests the legal document management system 14A to generate an appropriate legal document based on the new customer data entered through the CRM system (step S45). In response to the request for draft document, the legal document management system 14A transmits to the data management apparatus 17A a request for the metadata corresponding to the new customer data (step S46). (step S47). The data management apparatus 17A responds to the request by forwarding the requested metadata to the legal document management system 14A (step S48). The metadata corresponding to the new customer data is utilized by the legal document management system 14A to draft an appropriate document and the user B uses the draft agreement generated by the legal document management system as a starting point (step S49).

Figure 6:
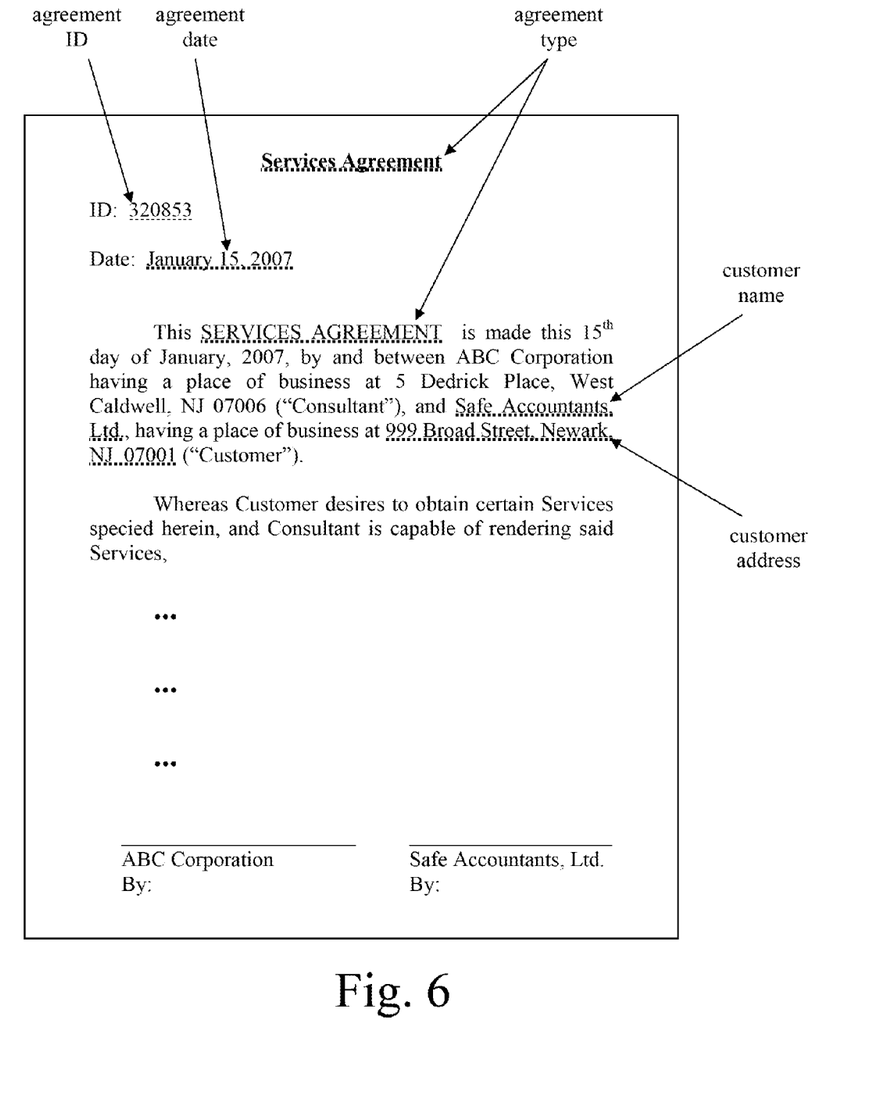
FIG. 6 shows an example of a document that can be generated by a legal document management system based on metadata appropriately converted by a data management apparatus, according to an exemplary embodiment of this disclosure.

An example of such a draft document is shown in FIG. 6. In the example of FIG. 6, a draft consulting services agreement is automatically generated by the legal document management system 14A based on the metadata stored in the data store, such as agreement ID, agreement type, customer name, customer address, etc. Other metadata based on the new customer data entered through the CRM system may also be included and are not shown in FIGS. 5 and 6, such as date of delivery, payment terms, etc. Further, some additional metadata may be added based on data entered by user B (such as agreement date).

When the editing of the draft document is finished (step S50, Yes), the draft document and accompanying metadata are transmitted by the legal document management system 14A to the data management apparatus 17A (step S51). Since the data received by the data management apparatus is generated by, and therefore in a format specific to, the legal document management system, the data management apparatus converts the received data to an appropriate format for storage in the data store (step S52). The data management apparatus checks whether there is a signed document, such as by prompting user B and optionally requesting the user to transmit (an image of) the signed document (step S53). If user B indicates that there is a signed document (step S53, Yes), the metadata stored in the data store is updated accordingly, such as by attaching the signed document (step S54) and changing the metadata "final" to "Yes" (step S55), and a notification is transmitted to user C in the billing department, indicating that the document has been finalized (step S56).

After receiving the notification, the user C typically requests the invoice management system 15A to generate a draft invoice for the specified (such as by agreement ID) transaction (step S57). In response to the request, the invoice management system 15A retrieves metadata from the data management apparatus (not shown in FIG. 4) and generates a draft invoice by using an appropriate template (step S58).

Figure 7:
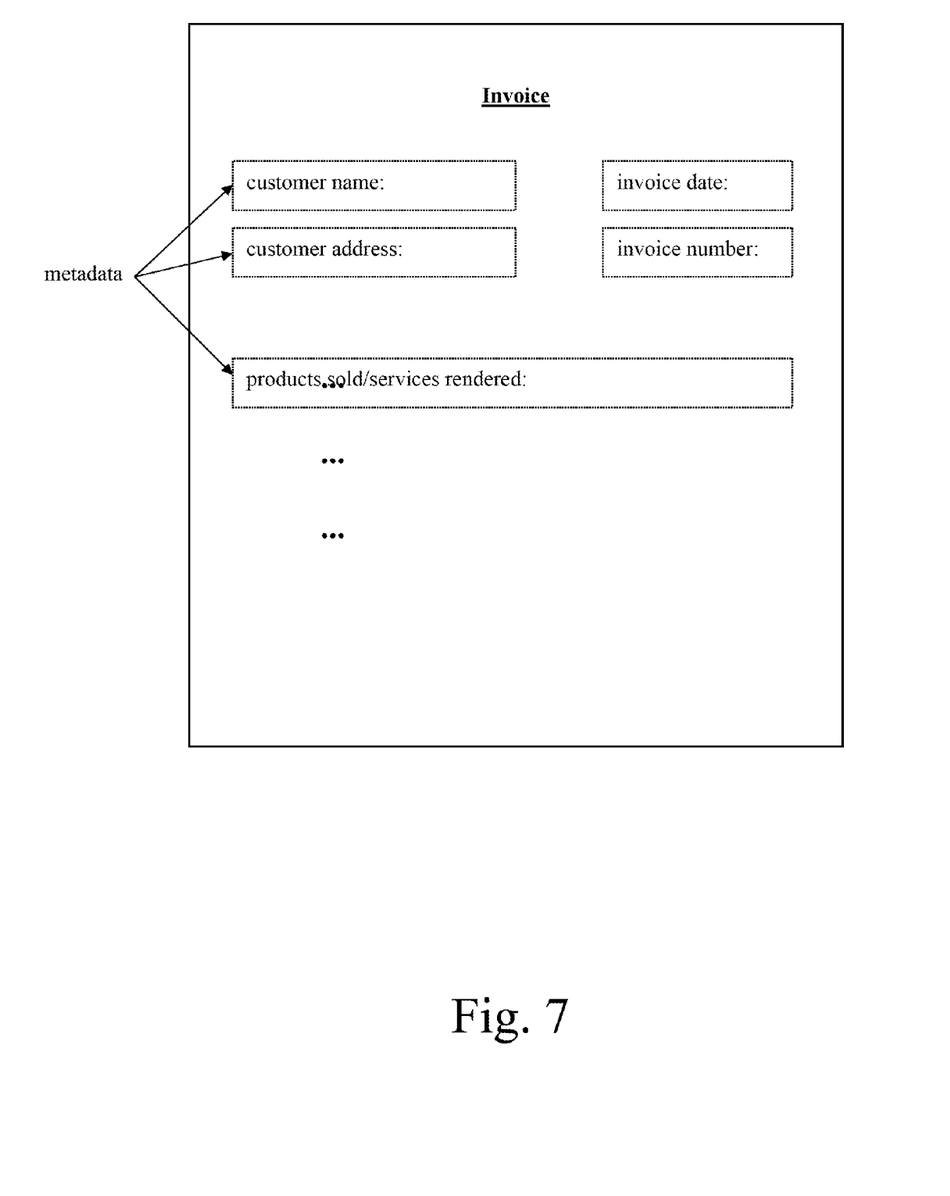
FIG. 7 shows a template of an invoice that can be populated automatically with data based on metadata appropriately converted by a data management apparatus, according to an exemplary embodiment of this disclosure.

Such a template is in shown in FIG. 7. The template is used as a starting point and automatically populated based on metadata, such as customer name, customer address, goods sold/services rendered, etc. Other metadata, such as invoice date and invoice number, may be either retrieved from the data store, automatically generated or generated based on data entered by the user C.

When the user C indicates that the invoice is finished (step S59, Yes), the invoice document and accompanying data is transmitted to the data management apparatus (step S60) and then converted by the data management apparatus and stored in the data store (step S61). Thereafter, a notification may be transmitted to the accounting department (step S62).

The workflow described above is merely an example of operations within the system 10A. It should be appreciated additional operations can benefit from the subject matter of this disclosure. For example, after the invoice has been transmitted to the customer, the accounts receivable department of the enterprise can make good use of the metadata stored in the data store to generate prompts and reminders internally and/ or to the customer. As another example, the marketing department can avail itself of the metadata to target its activities appropriately to existing customers. Many other uses are also available.

The above specific exemplary embodiments are illustrative, and many variations can be introduced on these exemplary embodiments without departing from the spirit of the disclosure or from the scope of the appended claims. For example, elements and/or features of different examples and illustrative exemplary embodiments may be combined with each other and/or substituted for each other within the scope of this disclosure and appended claims.

What is claimed is:

1. An apparatus for managing metadata for a plurality of systems having respective different metadata formats, said apparatus comprising:
   a conversion part configured to convert first metadata generated by a first system in a first format in connection with a first document, to a second format of a second system, and convert second metadata generated by the second system in the second format in connection with a second document, to a third format of an invoice management system;
   a metadata passing part configured to pass the converted first metadata in the second format to the second system, and pass the converted second metadata in the third format to the invoice management system; and
   a processing part that determines whether a user-modified version of the second document, that is generated by the second system based on the converted first metadata, is a finalized version of the second document,
   wherein in a case that the processing part determines that the user-modified version of the second document generated based on the converted first metadata is the finalized version of the second document, the processing part locks the user-modified version of the second document to prevent changes to the second document, causes finalized metadata to be generated and stored based on the finalized second document, and causes at least in part the converted second metadata generated based on the finalized second document to be utilized by the invoice management system to generate an invoice document, and
   wherein the second system utilizes the converted first metadata received from the metadata passing part to automatically complete a document template by filling in one or more blank sections in a displayed portion of the document template using the converted first metadata to generate the second document, the second document generated by the second system having a document format specific to the second system, and the completed document template of the second system being different from the first document.

2. The apparatus as claimed in claim 1, further comprising:
   a data store part configured to store the first metadata from the first system,
   wherein the conversion part retrieves the first metadata from the data store part and converts the retrieved first metadata in the first format to the second format of the second system, and the metadata passing part automatically passes the converted metadata in the second format to the second system.

3. The apparatus as claimed in claim 2, wherein the data store part stores one or more documents in association with the first metadata.

4. The apparatus as claimed in claim 1, further comprising:
   a data store part configured to store the first document and the first metadata from the first system; and
   a notification part configured to send a notification message indicating that the first document has been generated and stored in the data store part, when the first document and the metadata generated by the first system is stored in the data store part.

5. The apparatus as claimed in claim 4, wherein when the second document associated with the converted first metadata has been finalized and stored in the data store part in association with the converted first metadata, the notification part sends a notification message indicating finalization of the first document.

6. The apparatus as claimed in claim 1, wherein the processing part determines that the user-modified version of the second document is a finalized version of the second document, by determining that the user-modified version of the second document is a signed document that includes a user signature.

7. The apparatus as claimed in claim 1, wherein the finalized metadata generated based on the user-modified version of the second document indicates that the second document has been finalized.

8. The apparatus as claimed in claim 1, further comprising a notification part configured to selectively send a notification message to a specific user of the second system indicating that the first document has been generated.

9. A management system including a plurality of application systems for generating documents in an enterprise, each of the application systems generating a corresponding type of documents and associated metadata of a corresponding format, said management system comprising:
   a conversion part configured to convert first metadata generated by a first application system in a first format in connection with a first document, to a second format of a second application system, and convert second metadata generated by the second application system in the second format in connection with a second document, to a third format of an invoice management system;
   a metadata passing part configured to pass to the second application system the converted first metadata in the second format of the second application system, and pass to the invoice management system the converted second metadata in the third format of the invoice management system; and
   a processing part that determines whether a user-modified version of the second document, that is generated by the second application system based on the converted first metadata, is a finalized version of the second document,
   wherein in a case that the processing part determines that the user-modified version of the second document generated based on the converted first metadata is the finalized version of the second document, the processing part locks the user modified version of the second document to prevent changes to the second document, and causes finalized metadata to be generated and stored based on the finalized second document, and causes at least in part the converted second metadata generated based on the finalized second document to be utilized by the invoice management system to generate an invoice document, and wherein the second application system utilizes the converted first metadata received from the metadata passing part to automatically complete a document template by filling in one or more blank sections in a displayed portion of the document template using the converted first metadata to generate the second document, the second document generated by the second application system having a document format specific to the second application system, and the completed document template of the second application system being different from the first document.

10. The management system as claimed in claim 9, further comprising:

wherein the second application system utilizes the converted first metadata in connection with generation of the second document, associated with the first document, and second metadata generated in connection with the second document.

11. The management system as claimed in claim 10, further comprising:

a user interface part configured to present the second document for finalization, and wherein when the second document is finalized through the user interface part, the conversion part converts the second metadata to generate the finalized metadata indicating that the second document has been finalized.

12. The management system as claimed in claim 11, further comprising:

a notification part configured to send a notification message indicating finalization of the second document.

13. The management system as claimed in claim 9, further comprising:

a data store part configured to store the first document and first metadata generated by the first application system; and a notification part configured to send, when the first document and first metadata generated by the first application system are stored in said data store part, a notification message indicating that the first document has been generated and stored.

14. The management system as claimed in claim 9, wherein in response to a request from the second application system for the first metadata, the conversion part converts the stored first metadata in the first format to the second format, and the metadata passing part passes the converted first metadata in the second format to the second application system.

15. A method for managing metadata for a plurality of application systems for generating documents in an enterprise, each of the application systems generating a corresponding type of documents and associated metadata of a corresponding format, said method comprising:

(a) converting metadata generated by a first application system in a first format in connection with a first document, to a second format of a second application system;

(b) passing, to the second application system, the converted metadata in the second format of the second application system;

(c) utilizing by the second application system the converted first metadata to automatically complete a document template by filling in one or more blank sections in a displayed portion of the document template using the converted first metadata to generate a second document, the second document having a document format specific to the second application system, and the completed document template of the second application system being different from the first document;

(d) receiving a user-modified version of the second document from the second application system;

(e) determining whether the user-modified version of the second document is a finalized version of the second document;

(f) in a case that it is determined in (e) that the user-modified version of the second document is the finalized version of the second document, locking the user-modified version of the second document to prevent changes to the second document, and causing finalized metadata to be generated and stored based on the finalized second document;

(g) converting the finalized metadata in connection with the finalized second document, to a third format of an invoice management system;

(h) causing at least in part the converted second metadata generated based on the finalized second document to be utilized by the invoice management system to generate an invoice document.

16. The method as claimed in claim 15, further comprising:
storing in a data store the first document and the metadata generated by the first application system and sending a notification message indicating that the first document has been generated and stored in the data store.

17. The method as claimed in claim 15, further comprising:
utilizing the converted metadata in the second application system in connection with generation of the second document, associated with the first document, and generating second metadata in connection with the second document.

18. The method as claimed in claim 17, further comprising:
presenting the second document in a user interface for finalization, and when the second document is finalized through the user interface, converting the second metadata to generate the finalized metadata indicating that the second document has been finalized.

19. The method as claimed in claim 18, further comprising:
sending a notification message indicating finalization of the second document.

* * * * *